United States Patent
Biehl et al.

(10) Patent No.: US 11,045,393 B2
(45) Date of Patent: Jun. 29, 2021

(54) INSTALLATION FOR PRODUCING A MEDICAL PREPARATION

(71) Applicant: FRESENIUS KABI DEUTSCHLAND GMBH, Bad Homburg (DE)

(72) Inventors: Martin Biehl, Wendel (DE); Michael Hock, Münzenberg (DE); Henrik Schaake, Bad Homburg (DE); Stephan Gabriel, Dessau-Rosslau (DE); Martin Baecke, Dessau (DE)

(73) Assignee: Fresenius Kabi Deutschland GmbH, Bad Homburg (DE)

( * ) Notice: Subject to any disclaimer, the term of this patent is extended or adjusted under 35 U.S.C. 154(b) by 0 days.

(21) Appl. No.: 15/998,583

(22) PCT Filed: Feb. 17, 2017

(86) PCT No.: PCT/EP2017/053627
§ 371 (c)(1),
(2) Date: Aug. 16, 2018

(87) PCT Pub. No.: WO2017/140850
PCT Pub. Date: Aug. 24, 2017

(65) Prior Publication Data
US 2020/0276086 A1    Sep. 3, 2020

(30) Foreign Application Priority Data

Feb. 19, 2016 (EP) .................................... 16156529
Jun. 9, 2016 (EP) .................................... 16173695

(51) Int. Cl.
*A61J 3/00* (2006.01)
*A61J 1/20* (2006.01)
*B65B 3/00* (2006.01)
*F16K 27/00* (2006.01)

(52) U.S. Cl.
CPC ............. *A61J 3/002* (2013.01); *A61J 1/2041* (2015.05); *A61J 1/2062* (2015.05); *B65B 3/003* (2013.01); *F16K 27/003* (2013.01); *A61J 2200/70* (2013.01)

(58) Field of Classification Search
CPC .. A61J 3/002; A61J 1/20; A61J 1/2062; A61J 2200/70; F16K 27/003; B65B 3/003
See application file for complete search history.

(56) References Cited

U.S. PATENT DOCUMENTS

| 3,647,118 | A | * | 3/1972 | Johnson | ................... | B67D 1/04 |
| | | | | | | 222/145.1 |
| 5,313,992 | A | * | 5/1994 | Grabenkort | ............. | A61J 3/002 |
| | | | | | | 137/565.29 |
| 5,656,034 | A | * | 8/1997 | Kochersperger | .......... | F04B 9/02 |
| | | | | | | 210/656 |

(Continued)

FOREIGN PATENT DOCUMENTS

WO    WO-2016077538 A1 *  5/2016  .......... A61M 5/1456

*Primary Examiner* — Timothy L Maust
(74) *Attorney, Agent, or Firm* — Occhiuti & Rohlicek LLP (57) ABSTRACT

The invention relates to an installation for producing a medical preparation, in particular for producing a preparation for parenteral nutrition. Liquids are transferred by means of the installation from a plurality of source containers to a target container. The installation comprises a receptacle with drivers for a valve block, wherein the drivers of the valves are arranged offset from one another.

18 Claims, 11 Drawing Sheets

(56) References Cited

U.S. PATENT DOCUMENTS

| | | | | |
|---|---|---|---|---|
| 5,697,407 | A | 12/1997 | Lasonde | |
| 5,839,383 | A * | 11/1998 | Stenning | B63B 25/16 |
| | | | | 114/72 |
| 8,075,904 | B2 * | 12/2011 | Sakamoto | A61K 47/34 |
| | | | | 424/422 |
| 10,124,928 | B2 * | 11/2018 | Wissner | B65B 7/2892 |
| 2013/0186793 | A1 * | 7/2013 | Gagnieux | A61M 5/002 |
| | | | | 206/364 |
| 2014/0221528 | A1 * | 8/2014 | Ribi | G01K 11/12 |
| | | | | 523/351 |
| 2016/0200461 | A1 * | 7/2016 | Broadbent | B65D 41/28 |
| | | | | 53/426 |
| 2016/0310362 | A1 * | 10/2016 | Lane | A61M 39/24 |
| 2017/0183113 | A1 * | 6/2017 | Deutschle | F26B 5/06 |
| 2017/0326293 | A1 * | 11/2017 | Sims | A61M 5/1458 |
| 2017/0354941 | A1 * | 12/2017 | Brown | B01F 5/008 |
| 2018/0155070 | A1 * | 6/2018 | Min | B65B 3/003 |
| 2018/0208377 | A1 * | 7/2018 | Kloke | B65D 1/36 |
| 2019/0337658 | A1 * | 11/2019 | Diaz Guerrero | B65B 7/2821 |
| 2020/0276086 | A1 * | 9/2020 | Biehl | F16K 27/003 |

\* cited by examiner

INSTALLATION FOR PRODUCING A MEDICAL PREPARATION

CROSS REFERENCE TO RELATED APPLICATIONS

This application is the national phase under 35 USC 371 of international application no. PCT/EP2017/053627, filed Feb. 17, 2017, which claims the benefit of the priority date of European application no. 16156529.6, filed Feb. 19, 2016 and priority date of European application no. 16173695.4, filed Jun. 9, 2016. The contents of the aforementioned applications are incorporated herein by reference in their entireties.

TECHNICAL FIELD OF THE INVENTION

The invention relates to an installation for producing a medical preparation. The invention relates in particular to an installation by way of which, for example, infusion pouches and/or syringes for parenteral nutrition are filled.

BACKGROUND TO THE INVENTION

Installations for producing a medical preparation, in particular for producing a preparation for parenteral nutrition, are used, for example, in pharmacies or hospitals in order for a patient-specific preparation, in particular a mixture from various basic nutrients, trace elements, and vitamins, optionally also conjointly with a medication, to be filled.

Installations of this type are also referred to as TPN compounders (TPN=total parenteral nutrition). Systems known in practice and commercially available such as, for example, the MultiComp® system by the Fresenius company comprise a computer-controlled pump unit by way of which the component parts of the composition are transferred from different source containers into a target container that is located on a balance.

At least in the case of a separate pump not being available for each source container, it is necessary for the metering from different source containers to be controlled by way of valves.

By virtue of the multiplicity of source containers typically required, a correspondingly large number of valves are also necessary. In as far as the valves are grouped together in a central unit, this is associated with a correspondingly large installation space and complexity both in terms of the valve unit as well as for the drives of the valves required on the installation.

OBJECT OF THE INVENTION

By contrast, the invention is based on the object of providing an installation for producing a medical preparation that is configured so as to be simple, compact and reliable. The installation is in particular to possess a drive unit configured in a compact manner for controlling the valves.

BRIEF DESCRIPTION OF THE INVENTION

The object of the invention is achieved by an installation for producing a medical preparation, in particular by an installation for producing a preparation for parenteral nutrition, as claimed in one of the independent claims.

Preferred embodiments and refinements of the invention are to be derived from the respective dependent claims, the description, and the figures.

The invention relates to an installation for producing a medical preparation. The invention relates in particular to an installation by way of which target containers which are configured, for example, as infusion pouches or as syringes, are filled with a plurality of liquids which are retrieved from a multiplicity of source containers.

Liquids from a multiplicity of source containers are thus transferred into a target container.

To this end, the installation has at least one pump. The use of exactly one single pump which by way of valves retrieves the desired component parts from a plurality of source containers is conceivable. The pump is disposed so as to be downstream of the valve block (see below).

The use of a plurality of pumps, for example a pump for metering the main component parts of the medical preparation which are retrieved in comparatively large quantities, and a further pump by way of which micro quantities such as, for example liquids that contain vitamins and/or trace elements, are retrieved is however also conceivable.

Exactly one single pump is preferably used since all of the valves can thus be connected to a single outlet in a particularly simple manner.

The pump is preferably configured as a peristaltic pump, for example as a hose pump, in particular a roller pump or finger pump. The medium in the case of pumps of this type is conveyed by periodically compressing a hose. This enables inter alia the outlet of a valve block to be connected to a hose which is placed into the hose pump. The medium to be conveyed thus does not come into contact with parts of the pump.

A valve block of the installation which contains a multiplicity of valves can thus be used conjointly with the hose as a single-use component. Said single-use component is replaced after a specific time and/or after transferring a specific quantity of liquid. When being transferred by means of the installation, the liquid thus comes into contact only with component parts of this single-use component but not with further permanently used components.

A valve block is understood to be a housing which comprises a multiplicity of valves. Said housing can be configured in the shape of a cuboid, for example. The valves can form at least two rows in the housing.

The valve block preferably contains at least four, particularly preferably at least eight, and most particularly preferably at least twelve, connectors to which the source containers can be connected by in each case one hose.

The valves comprise activation members by way of which the valves can be opened and closed. The activation members can in particular be plugs.

The valve block is placeable onto a receptacle on the installation. In particular, the valve block is latch-fitted onto a receptacle that is designed as a support plate.

The activation members of the valves are activatable by way of entrainment elements of the installation.

The entrainment elements of the installation in one embodiment form a form-fitting element for the activation members of the valves. Said entrainment elements can open and close the respective valve by a rotating movement.

The installation has a multiplicity of entrainment elements. The installation preferably possesses at least three entrainment elements, particularly preferably six, or at least six entrainment elements. In one embodiment, each activation member of the valve block is assigned in each case one entrainment element of the installation. The number of entrainment elements can correspond to the number of activation members, for example.

According to the invention, the entrainment elements are disposed so as to be mutually offset.

Accordingly, in the case of the valve block the activation members of the valves are also disposed so as to be mutually offset.

When viewed in a plan view, the activation members sit particularly in at least two, preferably straight, rows in which the activation members are disposed so as to be mutually offset. The activation members disposed in one row are positioned so as to be axially offset in relation to the activation members that are disposed in the other row. At least two or at least three entrainment elements are preferably disposed per row.

The entrainment elements and the activation members of the valves, in relation to the direction of main extent of a valve block, thus do not lie so as to be opposite in pairs.

When viewed in a plan view of the valve block, the activation members thus do not form an arrangement in which imaginary straight lines that connect the activation members intersect orthogonally.

Rather, the entrainment elements of the installation and the activation members are preferably disposed according to the principle of the hexagonally tightest pack, but so as to be mutually spaced apart.

The entrainment elements and the activation members are in particular disposed in at least two rows, the activation members along said two rows preferably lying substantially on a straight line. The entrainment elements and the activation members in one row are preferably disposed so as to be offset by approximately half of the respective spacing of said entrainment elements and of the activation members in relation to the entrainment elements and the activation members of the other row.

The installation preferably comprises a drive unit having motors, wherein the motors are disposed in at least two mutually displaced rows. This enables a more compact design embodiment of the installation.

In particular, the motors, according to the principle of the hexagonally tightest pack, can also be disposed such that the housings of the motors along the rows are disposed so as to be mutually engaging.

The motors preferably possess housings that are configured so as to be substantially circular-cylindrical, said housings thus being able to be moved closer together.

In the case of one design embodiment of the invention the valves of the valve block comprise in each case one outlet to a catchment duct. The catchment duct is preferably part of the valve block. The catchment duct is in particular a central duct in a valve block that is configured as an injection-molded plastic part.

On account of the valves not being directly opposite each other, the outlets of all valves are disposed so as to be axially spaced apart from one another along the catchment duct.

It is in particular enabled by the invention that the entrainment elements conjointly with drive shafts of the motors lie on one axis.

This likewise enables a simple and compact construction. The connection to the respective motor from the activation member of the valve is performed in a linear manner in the direction of the motor, specifically so as to be preferably perpendicular to a direction of main extent of the valve block. It is not required that the motors are coupled from the side, for example by way of a gearbox.

However, in the context of the invention it is understood that the motor per se can comprise a gearbox. As is provided in the case of one embodiment of the invention, motors which have a planetary gearbox which is coupled to an electric motor are used in particular.

On account thereof, high drive forces and at the same time a precise motion control can be achieved on a small installation space.

The motors are monitored for load preferably by way of an electronic system, this means that any blocking of a valve is detected and the motor is stopped thereupon.

According to one embodiment of the invention 3/3-way valves having a blocked position, preferably a blocked central position, are used as valves.

This has the advantage that only one valve has to be used for two source containers.

It can thus furthermore be enabled that the activation members of the valves, but not the inflows of the valve block, are disposed so as to be mutually offset.

A regular arrangement of the inflows in turn facilitates checking by the user whether the correct inflows are connected.

In the case of one embodiment of the invention the entrainment elements are connected to the motors by way of dog clutches. A dog clutch is consequently installed on the drive shaft. On account thereof, any potential tolerances in the centering of the motors in relation to the entrainment elements are corrected in particular.

It is provided in particular that the entrainment elements are movable by way of the drive shafts, wherein a front portion of the drive shafts is mounted in a level of a drive unit that is disposed above the dog clutches. The mounting of the drive shafts at the side of the entrainment elements is thus decoupled from the mounting of the motor.

The motors, the motor controller, and the drive shafts for the entrainment elements are preferably provided as a modular drive unit.

The drive unit is preferably attached to a side of a housing of the installation that is opposite the entrainment elements.

A particularly simple and robust construction of the installation is thus enabled. The entrainment elements can thus be disposed on a support plate, for example, which is fitted on top of a housing of the installation or is part of a housing portion.

The drive unit can be fitted, in particular screw-fitted, to the lower side of the housing. The entrainment elements for the valves preferably possess form-fitting elements on the lower side. The entrainment elements for the valves are thus driven by entrainment elements of the drive shafts of the motors that are present on the drive shafts.

The invention furthermore relates to an installation for producing a medical preparation, in particular to an installation as has been described above and by way of which liquids from a plurality of source containers are transferable into a target container.

The installation comprises at least one pump and a removable valve block having a multiplicity of valves.

The valve block is preferably latch-fittable onto a support plate of the housing of the installation.

The valve block comprises a multiplicity of valves by means of which the inflow from the source containers is controllable.

According to the invention the valves are activatable by means of motors, wherein the installation comprises a sensor unit for monitoring the respective valve controller.

In order to enhance safety, it is also checked by way of the installation whether a valve is located in an opened or a closed position.

In one embodiment the sensor unit is simultaneously used for controlling the motors by way of which the valves are moved.

For example, if 3/3-way valves having a closed central position are used, the valve, proceeding from a closed central position, by approximately a quarter rotation, preferably approximately an eighth of a rotation, is opened in the one direction so as to open a first inflow. In a rotation in the other direction, another inflow is opened. Upon a quarter rotation the valve is completely opened, and the pump can be switched on.

The sensor unit in the case of one preferred embodiment comprises a plurality of light barriers into which, depending on the valve position, a finger reaches.

For instance in the case of the use of a 3/3-way valve having a closed central position, three light barriers are in particular used, wherein a finger in the closed position reaches into a centrically disposed light barrier, said finger in the two opening positions reaching in each case into another light barrier. In another embodiment, the two light barriers that are not centrically disposed are not operationally approached. Said two light barriers simply monitor the terminal positions. The two "open" positions are approached by way of the motor controller in a manner relative to the central position in which the valve is closed.

The finger can be designed in an arbitrary manner. Said finger can be, for example, a hook-shaped construction element which reaches from above or from below into an intermediate space which forms the light barrier.

In the case of a refinement of the invention, sensor units are disposed on the upper side of a support as well as on the lower side of a support. This likewise serves a compact construction of the installation.

By virtue of the valves that lie close together the sensor units, depending on the type of sensor units used, would get in the way of one another if said sensor units were likewise to be moved close to the valves, or to the drive shafts of the latter, respectively.

The arrangement of the sensor units on an upper side and on a lower side of the support in a simple manner enables that the sensor units can be disposed on two different planes, on account of which installation space is gained.

The support is in particular configured as a circuit board and thus serves for fastening the sensor units in mechanical terms, as well as for supplying said sensor units in electrical terms.

BRIEF DESCRIPTION OF THE DRAWINGS

The subject matter of the invention is to be explained in more detail hereunder with reference to an exemplary embodiment and by means of the drawings FIGS. 1 to 13 in which.

DETAILED DESCRIPTION OF THE DRAWINGS

Figure 1:
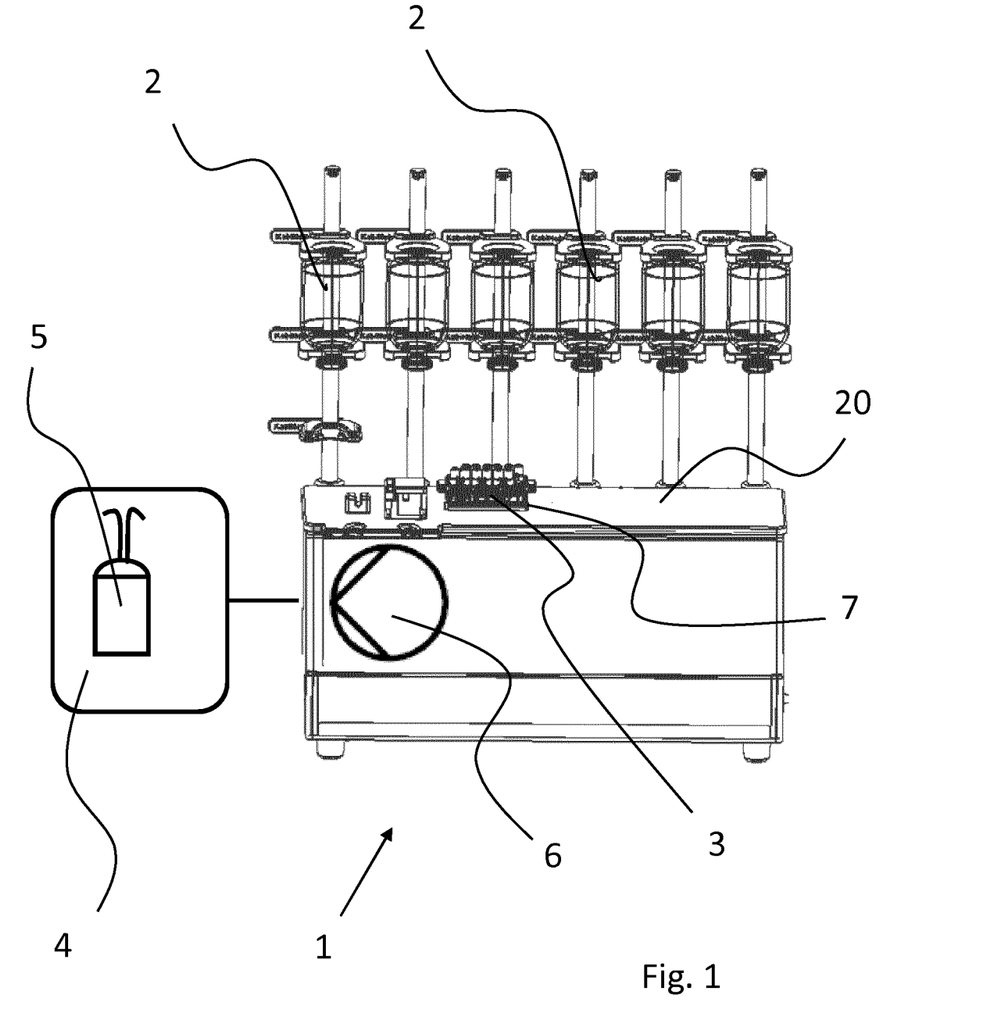
FIG. 1 shows a schematic illustration of an installation for producing a medical preparation.

FIG. 1 shows a schematic view of an installation 1 for producing a medical preparation.

The installation 1 is in particular configured for mixing preparations for parenteral nutrition. Infusion pouches or syringes are filled by means of the installation, for example.

To this end, a multiplicity of source containers 2 are connected to the installation 1. The source containers 2 illustrated here are suspended from a frame. Further source containers which are configured, for example, as pouches and which contain the main component parts of the nutrient composition are not illustrated here.

The installation 1 comprises a valve block 3 which has inflows 8a to 8l (cf. to this end FIG. 2) which are connected to the source containers 2 by way of hoses (not illustrated). The hoses here comprise, for example, a spike and/or a Luer lock connector by means of which said hoses are connected to the respective source container 2.

Figure 2:
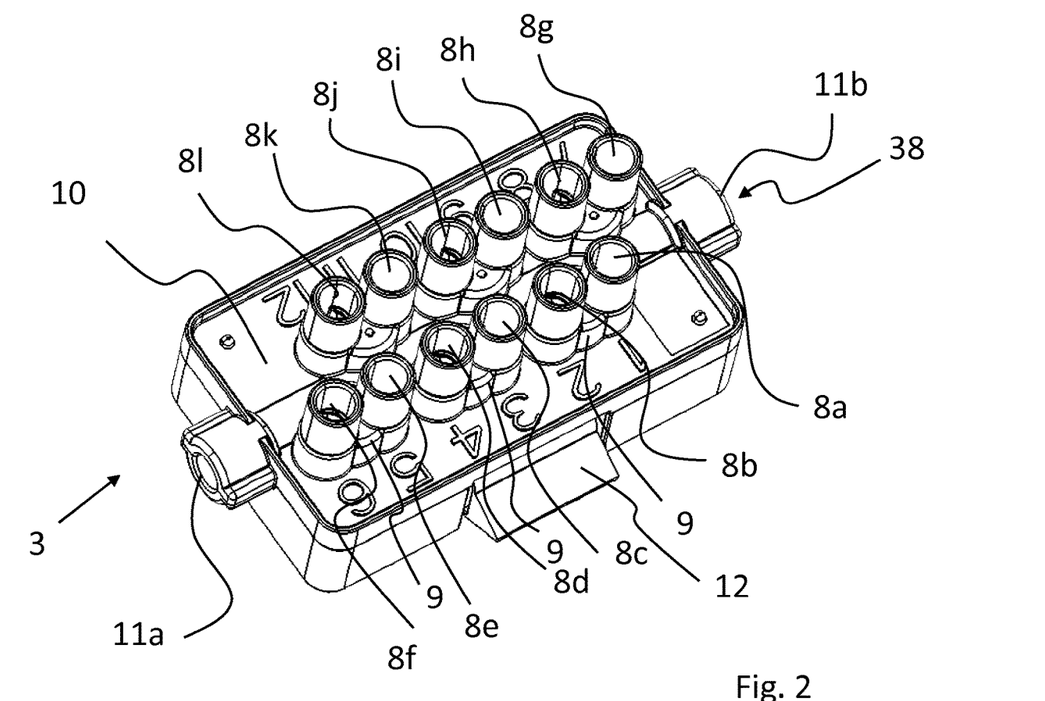
FIG. 2 and FIG. 3 show perspective detailed views of a valve block used.

By way of the activation of a valve 9 of the valve block 3 in each case one inflow 8a to 8l of the valve block 3 is connected to an outflow 11a, 11b of the valve block 3, and the respective liquid by means of a pump 6 can be transferred into a target container 5 (cf. to this end also FIG. 2). The hoses used therefor are not illustrated.

The target container 5 is disposed on a balance 4. It is in particular checked by way of the balance 4 whether the desired quantity of liquid has been retrieved.

The transfer from the various source containers 2 and thus the production of the medical preparation is performed in a computer-controlled manner.

Only one valve 9 of the valve block 3 is typically opened at any one time, that is to say that liquid is at all times retrieved from exactly one source container 2.

When being transferred, the liquid of the source container being pumped by the pump 6 does not immediately arrive in the target container 5, since the hoses are initially still filled with another liquid. Leaving aside other effects, the quantity of the liquid retrieved can however in principle be initially determined by way of the balance 4, specifically at least when the liquids in the various source containers 2 have approximately the same density.

For the completion of the filling procedure a neutral medium such as, for example, water, is generally pumped into the target container 5 in order to ensure that the desired nutrient component parts have completely exited a hose which connects the valve unit 3 to the target container 5 (not illustrated).

The valve block 3 conjointly with the hoses (not illustrated here) for connecting to the source containers 2 and to the target container 3 is preferably provided or used, respectively, as a single-use component. The valve block 3 is preferably latch-fitted onto a support plate 7 of the installation 1, and can thus be readily removed by the user.

Figure 5:
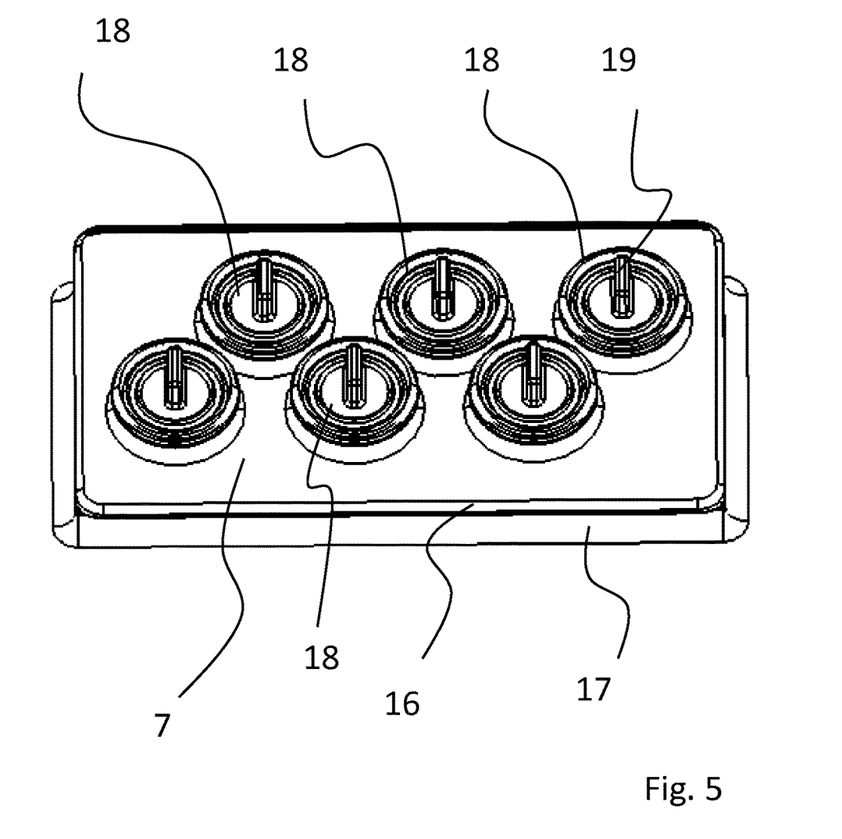
FIG. 5 shows a detailed view of a support plate having entrainment elements for the valves.

To this end, the housing 20 of the installation 1 comprises a support plate 7 which serves for latch-fitting the valve block 3 thereonto (cf. to this end also FIG. 5).

FIG. 2 shows a perspective illustration of the valve block 3, in which the upper side of the valve block 3 can be seen.

The valve block 3 comprises a housing that is preferably configured so as to be substantially cuboid, having the inflows 8*a* to 8*l*. The source containers 2 are connected to the inflows 8*a* to 8*l* by way of hoses (not illustrated here).

The inflows 8*a* to 8*l* are in each case preferably connected, preferably welded or adhesively bonded, to one hose in such a manner that said hose cannot be removed in a non-destructive manner.

The valve block 10 furthermore comprises valves 9, wherein each valve 9 is provided for controlling two inflows 8*a*-8*l*.

The explanation of the design embodiment of a valve 9 is performed by means of the valve 9 having the inflows 8*a* and 8*b*. The other valves 9 are preferably of identical configuration.

In this exemplary embodiment one valve 9 is tasked with controlling the inflows 8*a* and 8*b*. The inflows 8*a* to 8*b* in the plan view overlap in each case with the housing of the valve 9.

It can be seen that the valves 9 which have a valve housing that protrudes from said housing 10 are positioned in two straight rows that are disposed so as to be mutually offset.

As opposed to the valves 9, the inflows 8*a* to 8*l* are not disposed so as to be offset but disposed so as to be exactly opposite in the rows.

In order to be able to open and close in each case two inflows 8*a*-8*l*, the valves 9 are configured as 3/3-way valves having a closed central position.

The valve block 3 furthermore comprises the outflows 11*a* and 11*b* which are disposed on two opposite sides of the housing 10. Said outflows 11*a* and 11*b* are interconnected by way of a preferably central duct 38.

A hose which is connected to the target container 5 (not illustrated) can be connected either to the outflow 11*a* or to the outflow 11*b*. The outflow not required can be closed off.

The housing 10 furthermore comprises a sprung latching tab 12. The latter is configured as a handle. When the user pulls the latching tab 12 the valve block 3 can be removed from the support plate (7 in FIG. 1) of the installation 1.

Figure 3:
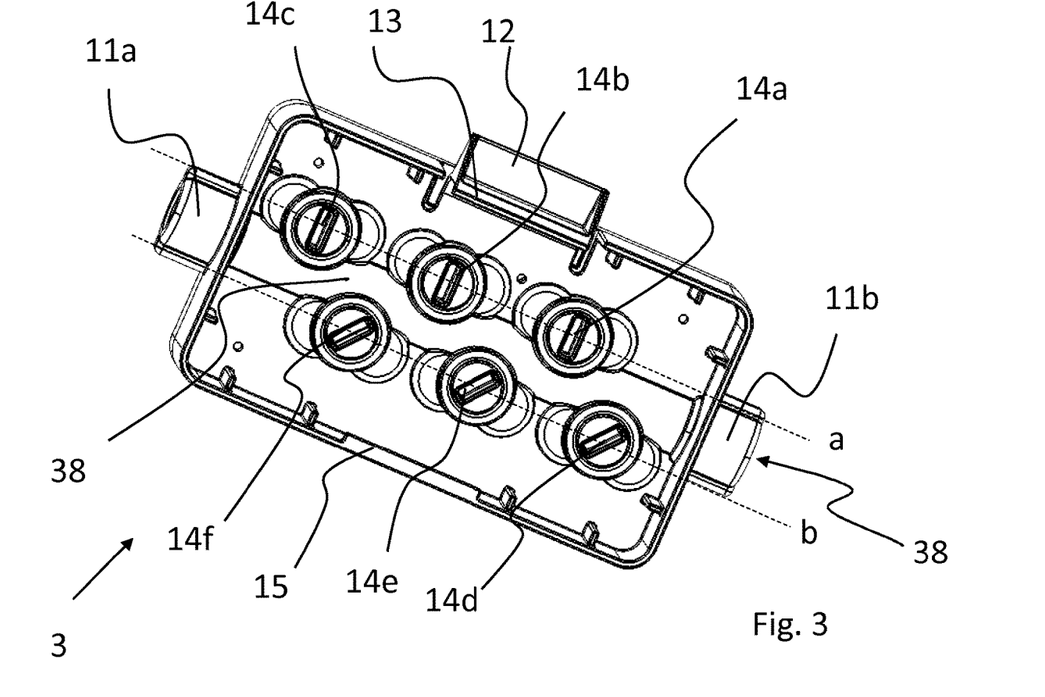

FIG. 3 shows a perspective view onto the lower side of the valve block 3. It can be seen that the valve block 3 comprises activation members, in this exemplary embodiment in the form of plugs 14*a*-14*f*, that are accessible from below. The plugs 14*a* to 14*f* are disposed in two rows which are disposed so as to be mutually offset.

In the plan view of the lower side of the valve block the plugs 14*a* to 14*c* to this end are disposed on the plotted imaginary straight line a, and the plugs 14*d* to 14*f* are disposed on the imaginary straight line b, wherein the plugs on the mutually opposite straight lines are in each case disposed so as to be mutually offset such that, for example, the plug 14*e* lies between the opposite plugs 14*a* and 14*b*.

Furthermore, the valves 9 and thus also the plugs 14*a* to 14*f* 11*e* along a central duct 38 which leads to the outflow 11*a* or 11*b* of the valve block 3.

The activation members, thus the plugs 14*a*-14*f*, have a form-fitting element which corresponds to the form-fitting element of an entrainment element 18 of the installation 1 (cf. to this end also FIG. 5). This form-fitting element in this embodiment is configured as a slot. The plugs 14*a*-14*f* are activated and the respective valve 9 is opened and closed by way of the entrainment elements 18 on the installation.

A slot as a form-fitting element is particularly suitable for the plugs since the latter in this exemplary embodiment are configured from an elastomer and are press-fitted into the housing of the valve block. Despite the elastomer material, a sufficiently stable connection between the entrainment element and the plugs 14*a*-14*f* is provided by way of a slot.

It can be furthermore seen on the lower side that the latching tab 12 has a web 13 which in the latched-on state engages below the periphery 16 of the support plate 7 (cf. to this end also FIG. 5).

A web 15 of the housing, opposite the web 13, serves as a form-fitting element for the valve block 3 on that side that is opposite the latching tab 12. The valve block 3 can therefore be removed by pulling the latching tab 12 from one side.

The valves 9 having the plugs 14*a* to 14*c* in this illustration can be seen in the central position and thus in the closed position. For illustrative purposes, the valves 9 having the plugs 14*d* to 14*f* are rotated by approximately an eighth of a rotation in relation to the closed central position. In each case one inflow is thus opened. It is understood that only one valve 9 is opened at any one time in the operation of the installation 1. In detail, the valve 9 is opened only toward one inflow 8*a* or 8*b*.

Figure 4:
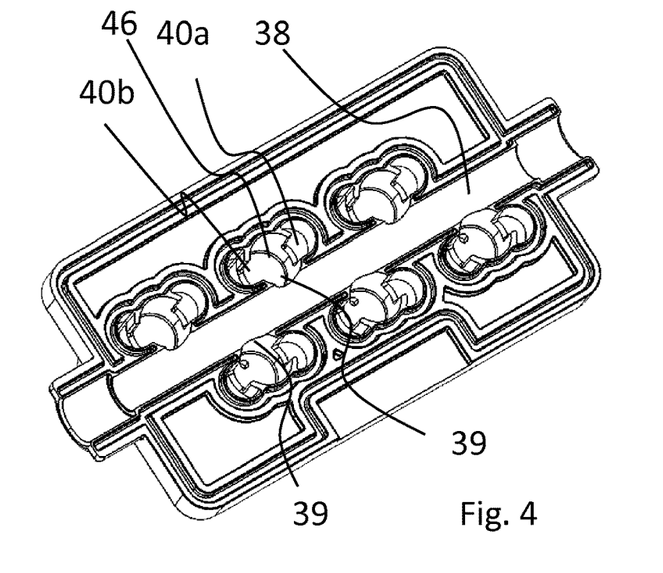
FIG. 4 shows a perspective view of the sectioned housing of the valve block according to FIG. 2 and FIG. 3.

FIG. 4 shows a perspective sectional view of the housing of the valve block 3 without plugs 14*a*-14*f*.

The design embodiment of the valves 9 will be explained using the example of a valve 9. Preferably, all of the valves 9 are of identical configuration.

It can be seen that a circular-cylindrically shaped valve housing 46 has the inlets 40*a* and 40*b* through which liquid from in each case one inflow 8*a*-8*l* can flow through the valve 9 when the respective plug 14*a*-14*f* is in an opened position.

It can furthermore be seen that each valve 9 has an outlet 39 which opens into the catchment duct 38.

The outlet 39 in this exemplary embodiment is formed in that the circular-cylindrically shaped housing of the valve 9 in the plan view overlaps the catchment duct 38. The valve housing 46 opens directly into the catchment duct 38.

On account of the valves 9 being disposed so as to be mutually offset, all of the outlets 39 along the catchment duct 38 are mutually spaced apart and are not mutually opposite in the axial direction.

FIG. 5 shows a perspective detailed view of the support plate 7 of the housing 20 of the installation 1.

The valve block 3 is latch-fitted onto this support plate 7.

To this end, the support plate 7 has a base 17. A periphery 16 of the support plate 7 protrudes beyond the base 17. The projecting periphery 16 serves as a form-fitting element for the latching tab 12 and the web 13 of the valve block 3, so as to latch-fit the latter onto the base 17.

The entrainment elements 18 for the activation members of the valves 9, thus for the plugs 14*a*-14*l*, protrude from the support plate 7.

The entrainment elements 18 are also disposed so as to be mutually offset in two rows, according to the principle of the hexagonally tightest pack, but so as to be mutually spaced apart.

The entrainment elements 18 in this exemplary embodiment have a web-shaped protrusion 19 and are configured in a manner similar to that of a slotted screwdriver. The protrusions 19 engage in the slots of the plugs 14*a*-14*f*.

The support plate 7 is preferably fitted to the housing 20 of the installation 1 from above, or can also be part of the housing, respectively.

Figure 6:
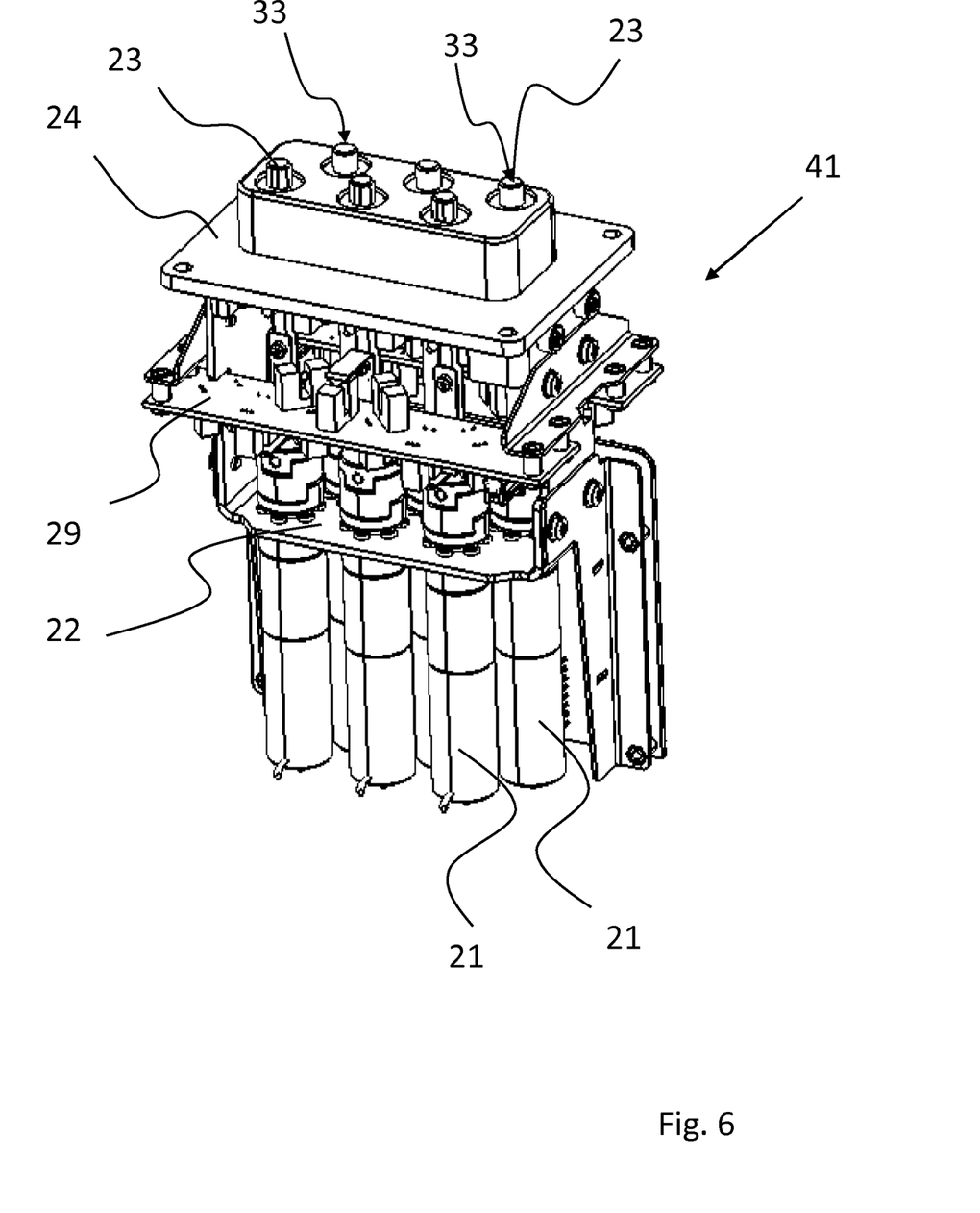
FIG. 6 and FIG. 7 show perspective views of the drive unit of the installation.

FIG. 6 shows a perspective view of the drive unit 41 for the entrainment elements 18.

The drive unit 41 is configured as a modular unit. Said drive unit 41 comprises a head part 24 which is fitted to the housing 20 of the installation 1 from below under the support plate 7, and to which the further components of the drive unit 41 are fastened.

The drive shafts 23 for the entrainment elements 18 protrude from the head part 24.

The end of the drive shaft 23 is preferably likewise configured as an entrainment element and has a form-fitting element for a corresponding form-fitting element of the entrainment elements 18 for the valves 9, said entrainment elements 18 for the valves 9 being in each case connected to the drive shaft 23 by way of said form-fitting element on the end of the drive shaft 23.

The motors 21 for driving the valves 9 are fitted to a support 22 of the drive unit 41, said motors 21 likewise being disposed in two mutually offset rows, in a manner corresponding to that of the valves 9. It can be seen that the entire drive unit 41 is thus configured so as to be particularly compact.

Figure 7:
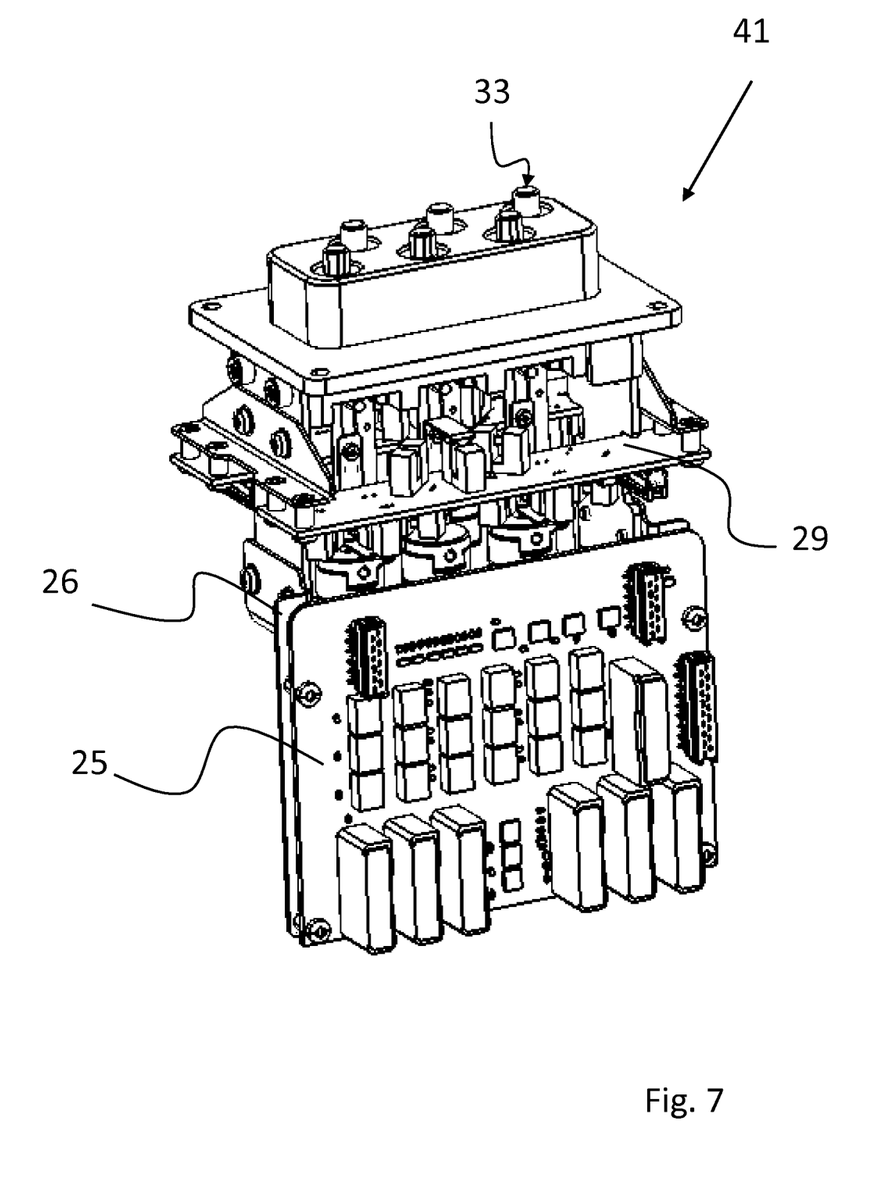

FIG. 7 shows a further perspective view of the drive unit 41, on which that side of the drive unit 41 that is opposite to the one illustrated in FIG. 6 can be seen.

It can be seen in this view that a circuit board 25 which comprises the electronics, the controller, and the power supply of the motors is fitted in a vertical orientation to a support 26 of the drive unit 41, this likewise contributing toward a compact construction mode.

Figure 8:
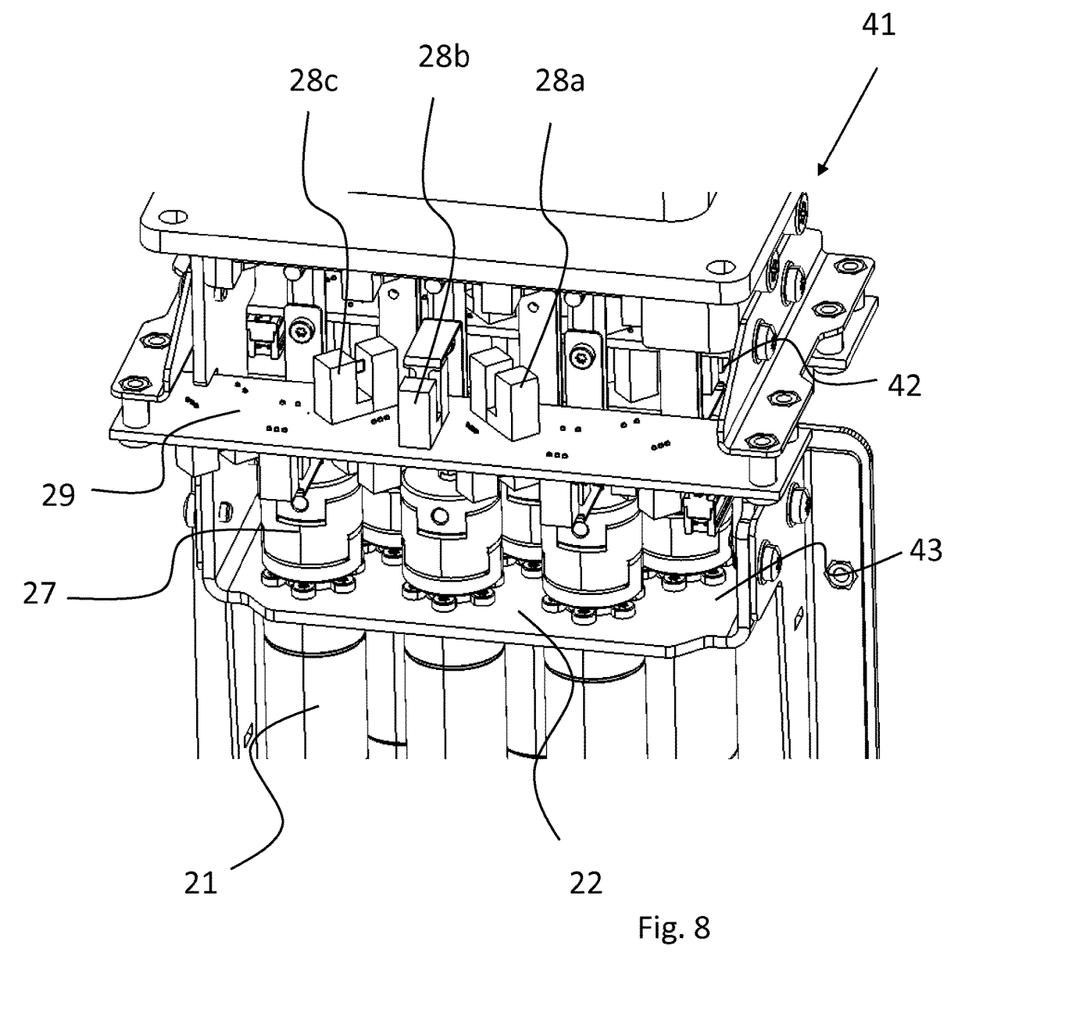
FIG. 8 to FIG. 10 show detailed illustrations of the drive unit.

FIG. 8 shows a perspective detailed illustration of the drive unit 41 illustrated in FIG. 6. It can be seen in this detailed illustration that the drive unit 41 configured in a modular manner comprises two levels 42, 43. The motors 21 are fitted to a support 22 that closes off the lower level 43. The drive shafts of the entrainment elements 18 are connected to the motors 21 by way of dog clutches 27 in the level 43.

The mounting of the drive shafts 23 of the entrainment elements 18 is thus decoupled from the mounting of the motors 21.

Figure 9:
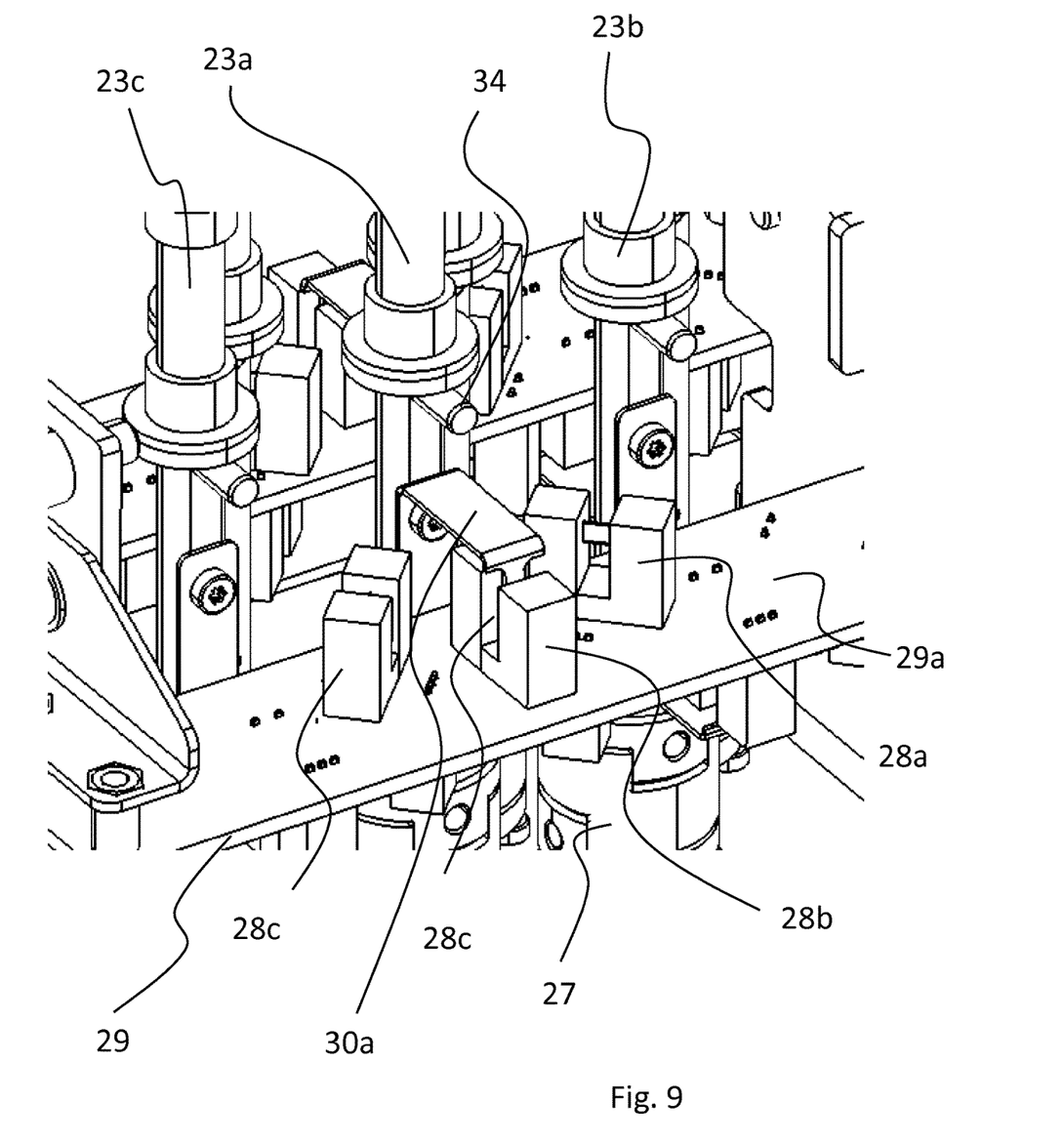

FIG. 9 shows a further perspective detailed illustration in which the sensor units of the drive unit 41 can be seen in particular.

A drive shaft 23a for an entrainment element can be seen. The drive shafts 32a-23c have a lateral protrusion 34, the latter in this exemplary embodiment configured as a pin, in order to prevent the drive shaft 23a from being able to be installed when rotated by 180°.

Furthermore, a finger 30a is attached to the drive shaft 23a. The finger 30a, depending on the valve position, reaches into one of the light barriers 28a to 28c that are disposed about a quadrant.

The light barriers 28a to 28c form a sensor unit.

The light barriers 28a to 28c are disposed on the upper side 29a of a support 29 which is configured as a circuit board and provides at least the power supply for the light barriers 28a to 28c.

The finger 30a, configured in a hook-shaped manner, of the drive shaft 23a, depending on the valve position, reaches from above into an opening of the light barriers 28a to 28c.

The light barriers 28a to 28c can serve for monitoring the valve position and/or for controlling the motors 21.

The finger 30a reaches into the central light barrier 28b. The valve 9 in this view is located in the central position, thus the closed position.

As can be seen here, on the upper side 29a of the support 29 there is no sensor unit provided for the drive shafts 23b and 23c.

Figure 10:
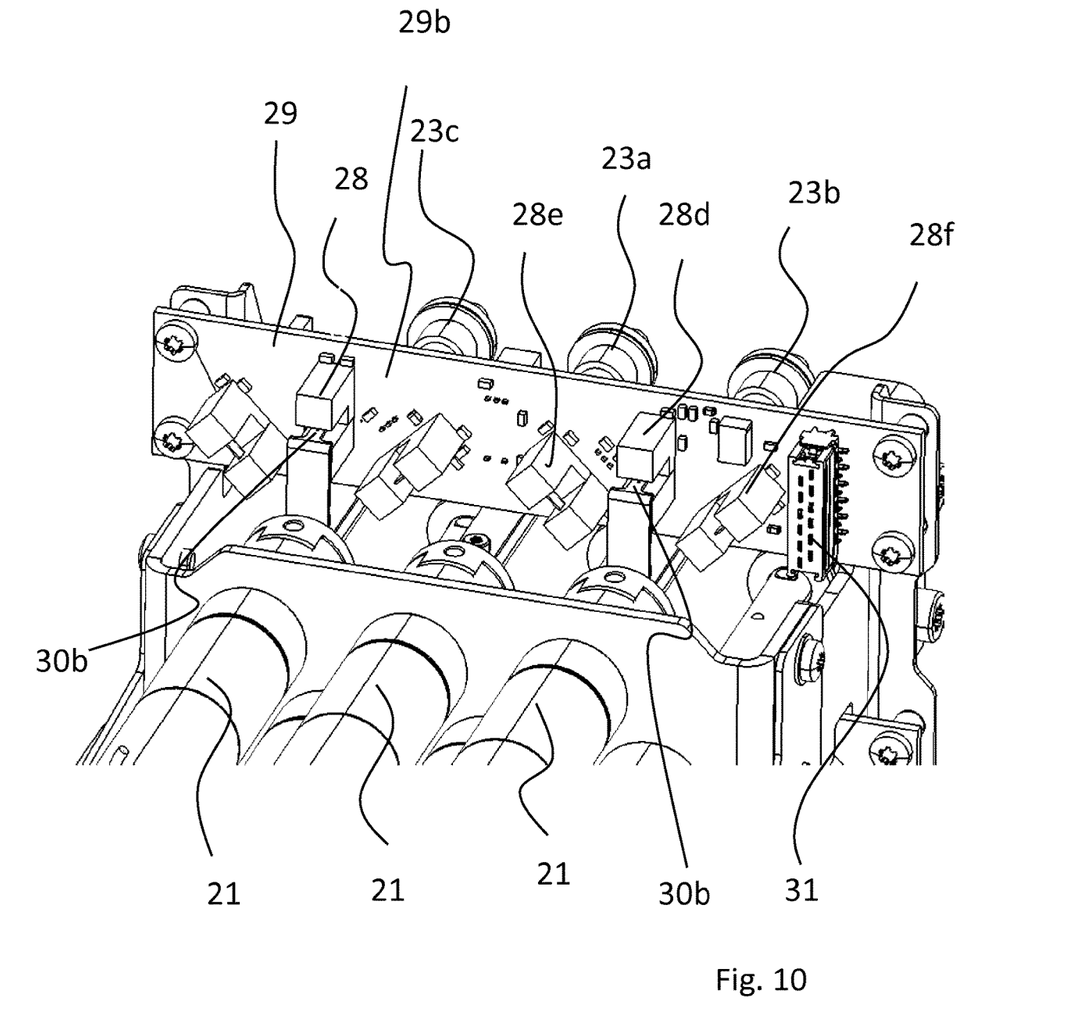

The sensor units for the drive shafts 23b and 23c can be seen in the perspective detailed illustration according to FIG. 10.

In this view, the lower side 29b of the support 29, on which the light barriers 28, 28d-28f, and thus the sensor units for the drive shafts 23b and 23c are located, can be seen.

The finger 30b of the drive shaft 23b, 23c here reaches in each case from below into a light barrier 28, 28d.

The construction of the sensor unit otherwise corresponds to that of the sensor unit illustrated in FIG. 9.

On account of the sensor units having been split between two planes, a more compact design embodiment has likewise been enabled.

The plug connector 31 which serves for the electrical connection of the support 29 that is configured as a circuit board can furthermore be seen.

Figure 11:
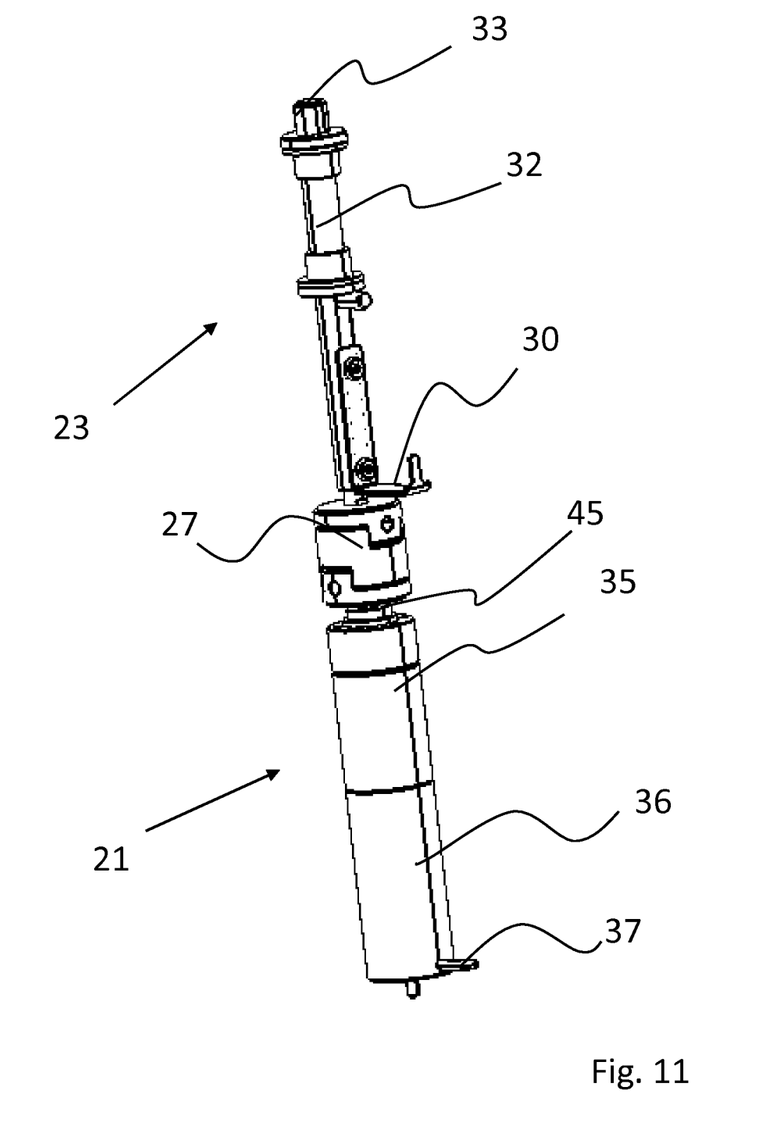
FIG. 11 shows a perspective view of the drive shaft for the entrainment elements and the motor.

FIG. 11 shows a perspective view of a drive shaft 23 as well as a motor 21. The drive shaft 23 corresponds to the drive shafts 23b and 23c which have been illustrated above and in which the finger 30b reaches from below into the light barriers 28, 28d-28f.

The drive shaft 23 and the motor 21 are disposed on one axis.

The drive shaft 23 comprises a front portion 32 which is separately mounted in a level 42 of the drive unit 41. This front portion 32, in order to be coupled to an entrainment element 18 for a valve 9, comprises an entrainment element 33.

The finger 30 for activating the light barriers of the sensor units is fitted to the drive shaft 23 below the front portion 32.

The drive shaft 23 is connected to the drive shaft 45 of the motor 21 by way of the dog clutch 27.

The mounting of the front portion 32 is thus decoupled from the mounting of the drive shaft 45 of the fitted motor 21 in such a manner that any potential tolerances in terms of the axial alignment are compensated for.

The motor 21 as a first portion comprises an electric motor 36 which is supplied with power by way of the cable 37.

A planetary gearbox 35 which ensures a high gearing ratio and thus enables precise controlling of the valves at a simultaneously high force is disposed as a second portion above the electric motor 36.

The motors 21 are monitored for load. Upon blocking of a valve 9, said blocking is detected and the motor 21 is stopped. The user of the installation 1 is informed by way of a respective error message.

Figure 12:
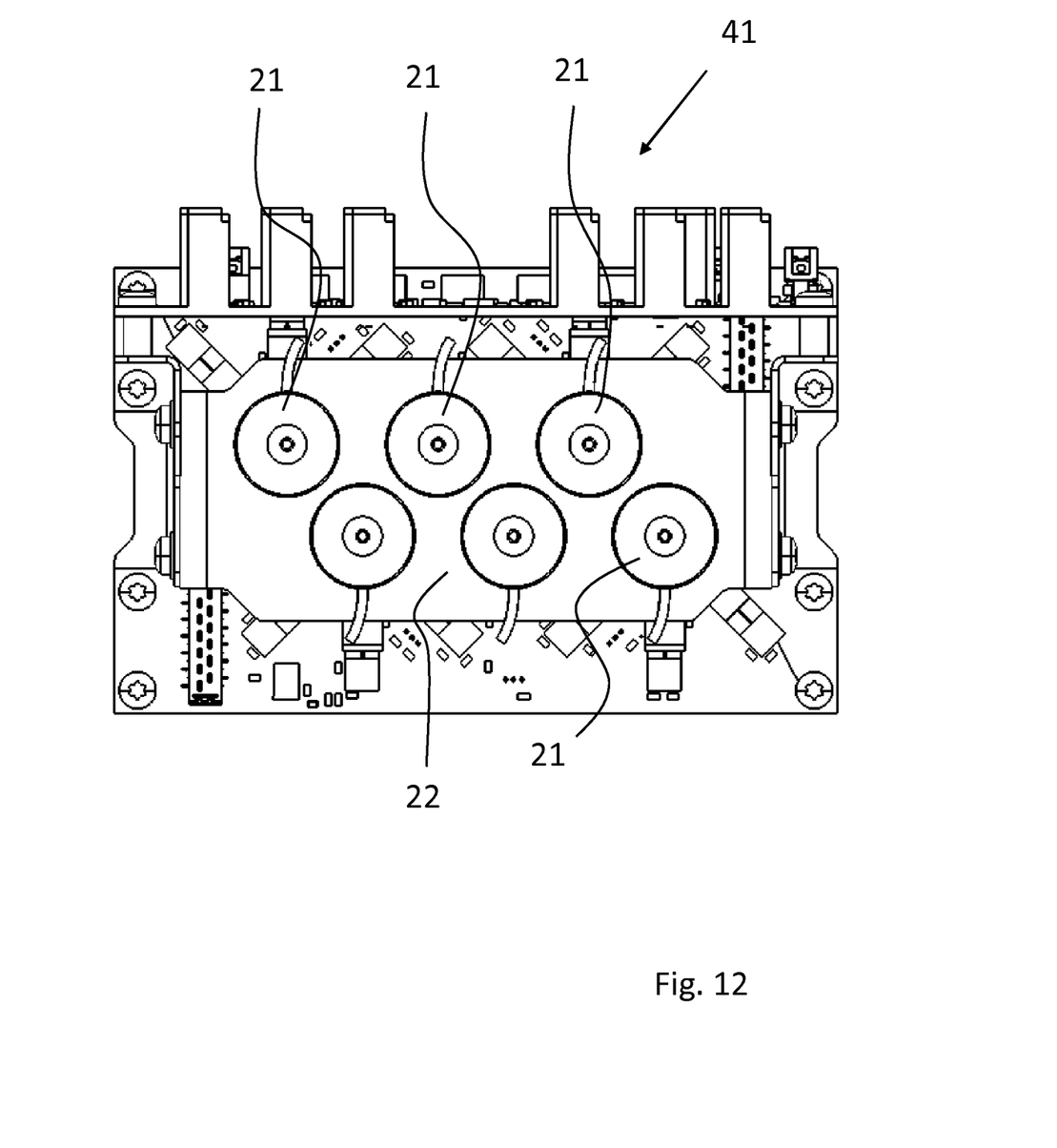
FIG. 12 shows a plan view onto the lower side of the drive unit.

FIG. 12 shows a plan view of the lower side of the drive unit 41.

It can be readily seen that the motors 21 are disposed in two mutually offset rows. The housings of the motors 21 thus engage in one another along the rows, this enabling a compact design embodiment of the drive unit 41 as well as of the valve block 3 that is connected to the drive unit 41.

Figure 13:
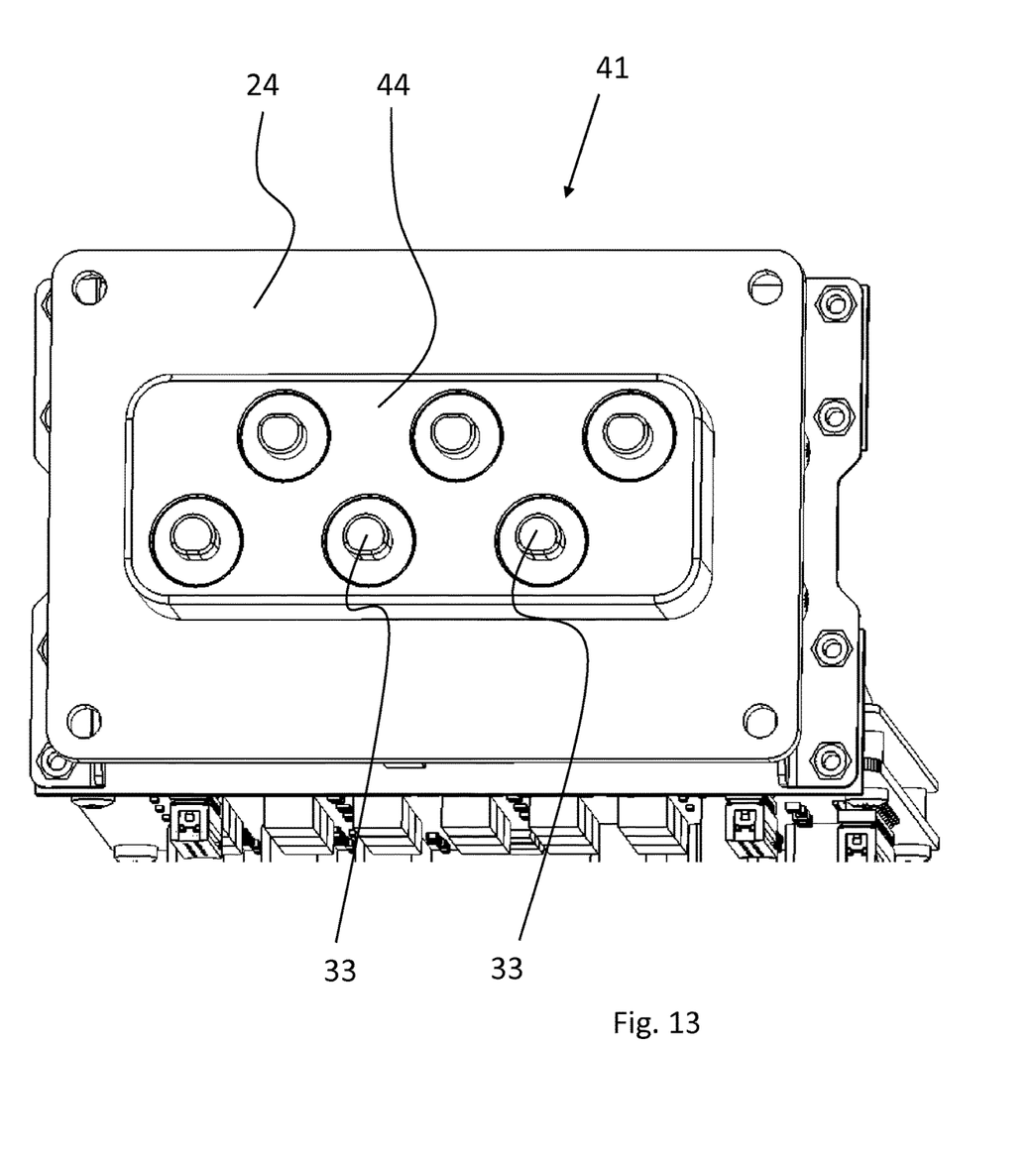
FIG. 13 shows a perspective detailed illustration of the upper side of the drive unit.

FIG. 13 shows a perspective detailed view onto the upper side of the drive unit 41.

It can be seen that the head part 24 of the drive unit 41 comprises a projecting base 44.

The entrainment elements 33 of the drive shafts 23, the former in turn activating the entrainment elements 18 for the valves 9, protrude from the base 44.

It can be seen that the entrainment elements 33 in this exemplary embodiment are configured in the manner of cams so as to interact with a corresponding form-fitting element on the lower side of the entrainment element 18 for the valve 9 (not illustrated).

The drive unit 41 configured in a modular manner can be screw-fitted to the housing 20 of the installation 1 from below, and the support plate 7, conjointly with the entrainment elements 18 for the valves 9, is fitted to the housing 20 of the installation 1 from above.

A reliable installation for producing medical preparations that is configured in a simple and compact manner has been able to be provided by the invention.

LIST OF REFERENCE SIGNS

1 Installation
2 Source container
3 Valve block
4 Balance
5 Target container
6 Pump
7 Support plate
8a-8l Inflow
9 Valve
10 Housing
11a, 11b Outflow
12 Latching tab
13 Web
14a-14f Plug, activation member
15 Web
16 Periphery
17 Base
18 Entrainment element
19 Protrusion
20 Housing
21 Motor
22 Support
23, 23a-23c Drive shaft
24 Head part
25 Circuit board
26 Support
27 Dog clutch
28, 28a-28f Light barrier
29 Support
29a Upper side
29b Lower side
30, 30a, 30b Finger
31 Plug connector
32 Front portion
33 Entrainment element
34 Protrusion
35 Planetary gearbox
36 Electric motor
37 Cable
38 Catchment duct
39 Outlet
40a, 40b Inlet
41 Drive unit
42 Level
43 Level
44 Base
45 Drive shaft
46 Valve housing

The invention claimed is:

1. An installation for producing a medical preparation, by way of which liquids from a plurality of source containers are transferable into a target container,
wherein the installation comprises
at least one pump and
a receptacle for a removable valve block having a multiplicity of valves,
wherein an inflow from the source containers is controllable by the valves,
wherein the valves comprise activation members,
wherein the installation has entrainment elements that activate the activation members to open and close the valves, and
wherein the entrainment elements are disposed so as to be mutually offset in at least two rows according to the principle of the hexagonally tightest pack so as to be mutually spaced apart.

2. The installation as claimed in claim 1, wherein the entrainment elements are disposed in at least two straight rows, wherein the entrainment elements in one row are offset by approximately half of the respective spacing of said entrainment elements in relation to the entrainment elements of the other row.

3. The installation as claimed in claim 1, wherein the installation comprises a drive unit having motors for the entrainment elements, wherein the motors are disposed in at least two mutually displaced rows.

4. The installation as claimed in claim 3, wherein the motors comprise housings, wherein the housings of the motors along the rows are disposed so as to be mutually engaging.

5. The installation as claimed in claim 1, wherein the entrainment elements for driving the valves are connected to drive shafts of the motors by way of drive shafts that run in a linear manner.

6. The installation as claimed in claim 1, wherein the entrainment elements are connected to the motors by way of dog clutches.

7. The installation as claimed in claim 1, wherein the installation comprises a modular drive unit for the entrainment elements, said drive unit being attached to a side of a housing of the installation that is opposite the entrainment elements.

8. The installation as claimed in claim 3, wherein the motors of the installation are monitored for load.

9. The installation as claimed in claim 1, wherein the installation comprises a sensor unit for monitoring the respective valve position.

10. A valve block for placing onto an installation for producing a medical preparation as claimed in claim 1.

11. The valve block as claimed in claim 10, wherein the valves have in each case one outlet to a catchment duct, wherein the outlets of all valves along the catchment duct are disposed so as to be mutually spaced apart in an axial direction of the catchment duct.

12. The valve block as claimed in claim 10, wherein the valves are configured as 3/3-way valves having a blocked central position.

13. The installation as claimed in claim 1, wherein the activation members comprise plugs.

14. The installation as claimed in claim 2, wherein each of the valves has an outlet that leads to a catchment duct that defines an axial direction along which the outlets are mutually spaced apart.

15. The installation as claimed in claim 9, wherein the sensor unit comprises a plurality of light barriers into which, depending on the valve position, a finger reaches.

16. An installation for producing a medical preparation, by way of which liquids from a plurality of source containers are transferable into a target container, wherein the installation comprises at least one pump and a receptacle for a removable valve block having a multiplicity of valves, wherein an inflow from the source containers is controllable by the valves, and wherein the valves comprise activation members, wherein the installation has entrainment elements by way of which the valves are activatable, wherein the entrainment elements are disposed so as to be mutually offset in at least two rows wherein the entrainment elements are movable by way of the drive shafts, wherein a front portion of the drive shafts is mounted in a level of a drive unit that is disposed above the dog clutches.

17. An installation for producing a medical preparation, by way of which liquids from a plurality of source containers are transferable into a target container, wherein the installation comprises at least one pump and a receptacle for a removable valve block having a multiplicity of valves, wherein an inflow from the source containers is controllable by the valves, and wherein the valves comprise activation members, wherein the installation has entrainment elements by way of which the valves are activatable, wherein the entrainment elements are disposed so as to be mutually offset in at least two rows, wherein the installation comprises a sensor unit for monitoring the respective valve position, wherein the sensor unit comprises a plurality of light barriers into which, depending on the valve position, a finger reaches.

18. The installation as claimed in claim 17, wherein the installation comprises a plurality of sensor units, wherein the sensor units are disposed on the upper side of a support as well as on the lower side of a support, in particular of a printed circuit board.

* * * * *